United States Patent [19]

Boyer et al.

[11] Patent Number: 5,152,383

[45] Date of Patent: Oct. 6, 1992

[54] VISCOUS FLUID COUPLING AND EXTERNAL ACTUATOR ASSEMBLY THEREFOR

[75] Inventors: Rick L. Boyer, Marshall, Mich.; Todd King, Cedarburg, Wis.

[73] Assignee: Eaton Corporation, Cleveland, Ohio

[21] Appl. No.: 843,688

[22] Filed: Feb. 28, 1992

[51] Int. Cl.⁵ ..................... F16D 35/00; F16D 43/25
[52] U.S. Cl. .................... 192/58 B; 192/82 T; 192/84 R
[58] Field of Search ............... 192/58 B, 82 T, 84 R; 310/78

[56] References Cited

U.S. PATENT DOCUMENTS

| | | | |
|---|---|---|---|
| 4,056,178 | 11/1977 | Detty | 192/58 B |
| 4,270,641 | 6/1981 | Nonnenmann et al. | 192/58 B X |
| 4,302,156 | 11/1981 | LaFlame | 192/58 B X |
| 4,650,045 | 3/1987 | Weible et al. | 192/58 B X |
| 4,828,088 | 5/1989 | Mohan et al. | 192/58 B |
| 4,846,325 | 7/1989 | Mohan | 192/58 B |
| 4,874,072 | 10/1989 | Mohan et al. | 192/58 B |
| 4,893,703 | 1/1990 | Kennedy et al. | 192/58 B |
| 4,987,986 | 1/1991 | Kennedy et al. | 192/58 B |
| 5,025,906 | 6/1991 | O'Neill et al. | 192/58 B |
| 5,059,884 | 10/1991 | Shah et al. | 318/701 |

*Primary Examiner*—Rodney H. Bonck
*Attorney, Agent, or Firm*—L. J. Kasper

[57] ABSTRACT

A fluid coupling device is disclosed of the type having an output coupling assembly (13) and an input coupling member (11). Control of the flow of viscous fluid between a reservoir chamber (35) and an operating chamber (33) is controlled by rotation of a valve arm (43), to cover or uncover a fill opening (45). Rotation of the valve arm is affected by an actuator assembly (61). An electrical signal to a coil (69) results in a flux path (FP) through a stationary ferromagnetic housing (63), with the flux passing through an armature (83) which is attached to the valve member. The flux path passes from armature segments (105) through respective pole pieces (111), which comprise part of the outer cylindrical surface of the reservoir chamber (35). Thus, energization of the coil (69) results in rotation of the valve member (43) without the need for frictional engagement of friction surfaces.

22 Claims, 5 Drawing Sheets

VISCOUS FLUID COUPLING AND EXTERNAL ACTUATOR ASSEMBLY THEREFOR

BACKGROUND OF THE DISCLOSURE

The present invention relates to viscous fluid couplings, and more particularly, to such couplings which are used to drive vehicle radiator cooling fans, wherein the engagement or disengagement of the viscous fluid coupling is controlled in response to a remotely sensed condition, such as coolant temperature.

Viscous fluid couplings have been in commercial use for many years to drive the vehicle radiator cooling fan, especially on vehicles such as automobiles and light trucks. The use of such viscous couplings has been widespread, and quite desirable because such couplings can operate in either an engaged condition, or a disengaged condition, depending upon a sensed temperature condition. Most of the couplings (viscous fan drives) which have been in commercial use include some form of temperature-sensing bimetallic element which senses ambient air temperature adjacent the fan drive, and controls valving within the fan drive in response to the sensed temperature, to achieve either the engaged or the disengaged condition, as is appropriate.

In certain vehicle applications, it has become desirable to sense directly the temperature of the liquid coolant entering the radiator, and to control the viscous fan drive in response to the coolant temperature, whereby the responsiveness of the fan drive is improved, when compared to the conventional fan drive which senses the ambient air temperature.

In order to improve the ability to control such remote-sensing fan drives, it has been considered desirable to convert the sensed temperature into an electrical signal, and to control the engagement of the fan drive by means of that electrical signal. Such electrical control also makes it possible to incorporate more sophisticated logic in the control system. U.S. Pat. No. 4,846,325, assigned to the assignee of the present invention, and incorporated herein by reference, discloses a remote-sensing viscous fan drive in which there is electromagnetic control of the frictional engagement of an armature, relative to a stationary housing, thereby controlling the rotary position of a valve element in the fan drive to cover or uncover a fluid inlet port.

In the device of the referenced patent, the electromagnetic control includes a tethered housing through which extends an armature shaft, connected to the valve element of the fan drive. The armature shaft is supported, relative to the stationary housing by means of a pair of bearing sets. There is an additional bearing set disposed between the stationary housing and the cover assembly of the rotating fan drive. The multiplicity of bearing sets make such a control complicated and expensive to manufacture. In addition, the fact that valve position is controlled in response to the degree of frictional engagement raises the possibility that, over a period of time, there can be variations (degradation) in the performance of the control, as the frictional surfaces wear.

SUMMARY OF THE INVENTION

Accordingly, it is an object of the present invention to provide an actuator assembly for a fluid coupling device which is simpler in construction, and less expensive to manufacture than the prior art actuator assemblies.

It is a more specific object of the present invention to provide such an actuator assembly which includes electromagnetic control, and which eliminates the use of frictional engagement to position the valve member.

The above and other objects are accomplished by the Provision of a fluid coupling device of the type including a first rotatable coupling assembly defining an axis of rotation, the first coupling assembly including a first coupling member and a cover member cooperating to define a fluid chamber therebetween. A valve means is associated with the first coupling assembly and is disposed to separate the fluid chamber into a fluid operating chamber and a fluid reservoir chamber. A second rotatable coupling member is disposed in the fluid operating chamber and is rotatable relative to the first coupling member, the first coupling assembly cooperating with the second coupling member to define a viscous shear space therebetween. The valve means is operable to control the flow of fluid between the reservoir chamber and the operating chamber, in response to rotary input motion. An actuator assembly is operably associated with the first coupling assembly and with the valve means, and is operable to move the valve means. The actuator assembly includes the source of an electromagnetic field.

The improved fluid coupling device is characterized by an armature member including a plurality of armature segments, disposed in the reservoir chamber, and operable to provide the rotary input motion. The actuator assembly includes a ferromagnetic housing portion disposed adjacent the source of the electromagnetic field. The actuator assembly is disposed adjacent the forward surface of the cover member. A plurality of electromagnetic pole pieces are each disposed within the cover member and extending axially forward to a location adjacent the forward surface of the cover member. The pole pieces are disposed in an annular pattern about the axis of rotation, whereby the pole pieces are disposed adjacent the ferromagnetic housing portion and closely spaced thereto as the first coupling assembly rotates relative to the actuator assembly. Each of the plurality of pole pieces is disposed adjacent one of the armature segments and in operative association therewith, whereby, upon energization of the source of the electromagnetic field, a flux path is established which includes the ferromagnetic housing portion, the electromagnetic pole pieces, and the armature segments. The resulting magnetic flux causes a moment (torque) on the armature, thus causing the armature and the valve to rotate.

DESCRIPTION OF THE PREFERRED EMBODIMENTS

Figure 1:
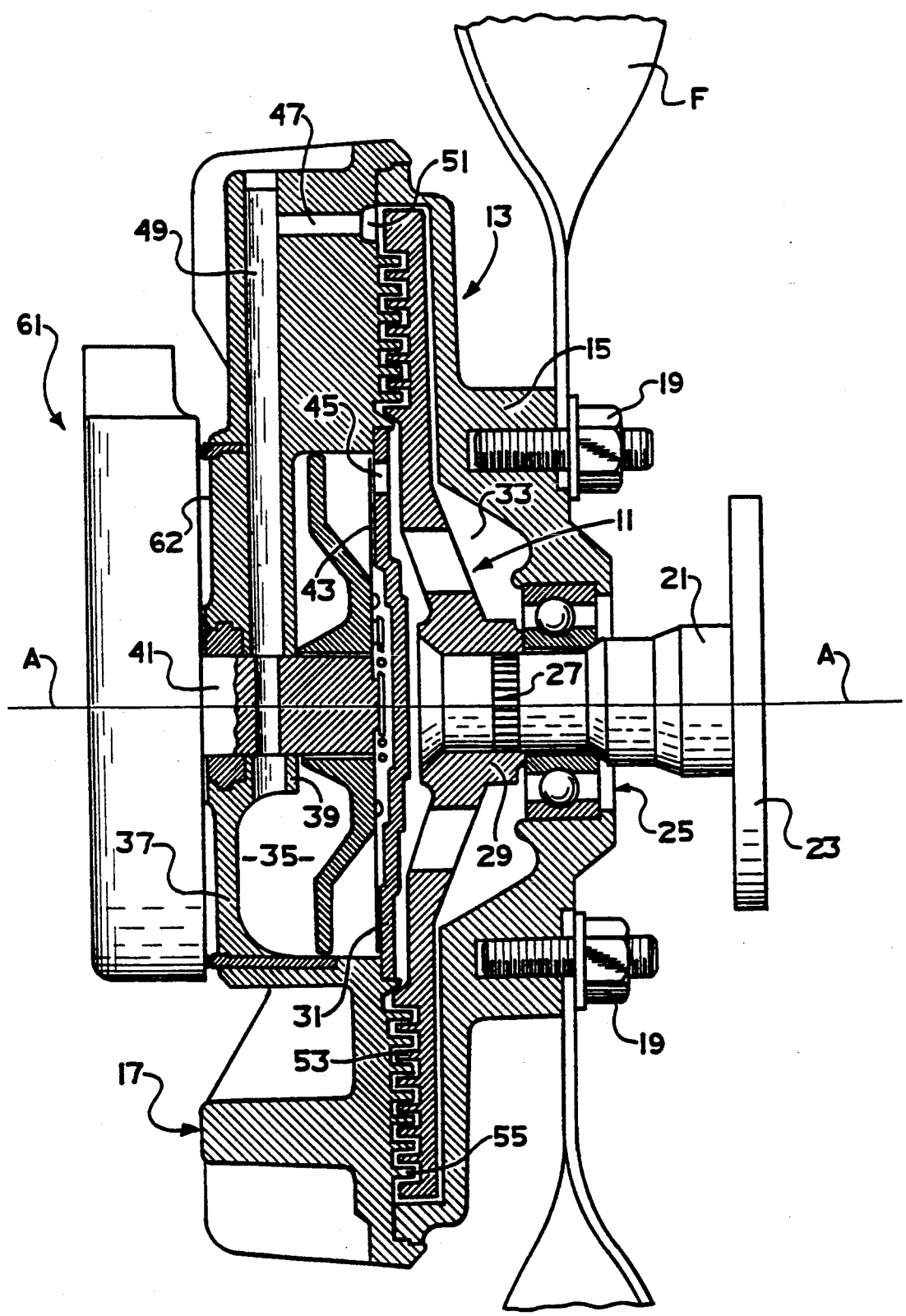
FIG. 1 is an axial cross-section of a viscous fluid coupling and electromagnetic actuator assembly in accordance with the present invention, the actuator assembly being shown in external plan view.

Referring now to the drawings, which are not intended to limit the invention, FIG. 1 illustrates one preferred form of a viscous fluid coupling (viscous fan drive) of the type with which the present invention may be utilized. The fluid coupling illustrated in FIG. 1 includes an input coupling member, generally designated 11, and an output coupling assembly, generally designated 13. The output coupling assembly 13 includes a die-cast housing member 15 and a die-cast cover member 17, the members 15 and 17 being secured together by a rollover of the outer periphery of the cover member 17, as is well known in the art. The fluid coupling is adapted to be driven by a liquid cooled engine and, in turn, drives a radiator cooling fan F. The fan F may be attached to the housing member 15 by means of a plurality of threaded nuts 19. It will be understood however, that the use of the present invention is not limited to any particular configuration of fluid coupling, or any particular application thereof, except as specifically noted hereinafter.

The fluid coupling includes an input shaft 21 on which the input coupling member 11 is mounted. The input shaft 21 is rotatably driven, typically by means of a flange 23, which may be bolted to a mating flange of an engine water pump. The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft causes rotation of the input coupling member 11.

The housing member 15 and the cover member 17 cooperate to define a fluid chamber which is separated, by means of a circular valve plate 31, into a fluid operating chamber 33, and a fluid reservoir chamber 35. Thus, it may be seen that the input coupling member 11 is disposed within the fluid operating chamber 33. The cover member 17 defines a raised, annular reservoir-defining portion 37, which is disposed to be generally concentric about an axis of rotation A of the device, and further defines a generally cylindrical shaft support portion 39. Rotatably disposed within the shaft support portion 39 is a ferromagnetic valve shaft 41, extending outwardly (to the left in FIG. 1) through the cover member 17. In connection with subsequent description of the present invention, the valve shaft 41 will also be referred to as an "armature shaft", for reasons which will become apparent. Disposed adjacent the inner end (right end in FIG. 1) of the valve shaft 41 is a valve arm 43, which may be better understood by reference to U.S. Pat. No. 3,055,473, assigned to the assignee of the present invention, and incorporated herein by reference. More specifically, the valve arm 43 may preferably be constructed in accordance with the teachings of U.S. Pat. No. 4,974,712, also assigned to the assignee of the present invention and incorporated herein by reference. Movement of the valve arm 43 controls the flow of fluid from the reservoir chamber to the operating chamber 33, through a fill opening 45 formed in the valve plate 31.

The cover member 17 defines an axial passage 47 in communication with the fluid operating chamber 33, and a generally radial passage 49, which provides fluid communication from the axial passage 47 to the fluid reservoir chamber 35. Disposed adjacent the axial passage 47 is a pumping element (wiper) 51, operable to engage the relatively rotating fluid in the operating chamber 33, and generate a localized region of relatively higher fluid pressure. Therefore, the wiper 51 is operable continually to pump a small quantity of fluid back into the fluid reservoir chamber 35, through the passages 47 and 49, as is well known to those skilled in the art.

In the subject embodiment of the invention, the input coupling member 11 includes a forward surface which defines a plurality of annular lands 53. The adjacent surface of the housing member 17 forms a plurality of annular lands 55. The lands 53 and 55 are interdigitated to define therebetween a serpentine-shaped viscous shear space, which may also be referred to hereinafter by the reference numerals 53 and 55. It is believed that in view of the above-incorporated U.S. patents, those skilled in the art can fully understand the construction and operation of the part of the fluid coupling illustrated in FIG. 1, and described so far, including the various flow paths for the viscous fluid contained therein. When torque is transmitted from the vehicle engine by means of the input shaft 21, to the input coupling member 11, the result is a shearing of the viscous fluid contained in the shear space 53,55, resulting in the transmission of torque to the output coupling assembly 13 and the cooling fan F.

Referring still to FIG. 1, attached to the cover member 17 is an actuator assembly, generally designated 61, and disposed adjacent a forward surface 62 of the cover member 17. The assembly 61 may be referred to as being "remote sensing" because it is responsive to an electrical input signal transmitted from a remote location at which changes in a predetermined condition are sensed, with the changes in the predetermined condition being represented by changes in the electrical signal transmitted to the actuator assembly 61. Typically the predetermined condition being sensed is the temperature of the liquid coolant in the vehicle engine block. The assembly 61 is referred to as an "actuator" assembly because it accomplishes the actuation of the valve arm 43 in response to the changes in the electrical input signal. More specifically, the function of the actuator assembly 61 is to rotate the valve arm 43 away from its normal position covering the fill opening 45 (the disengaged condition of the fluid coupling) toward a position in which the valve arm 43 uncovers the fill opening 45 (the engaged condition), as the temperature of the coolant increases.

Figure 2:
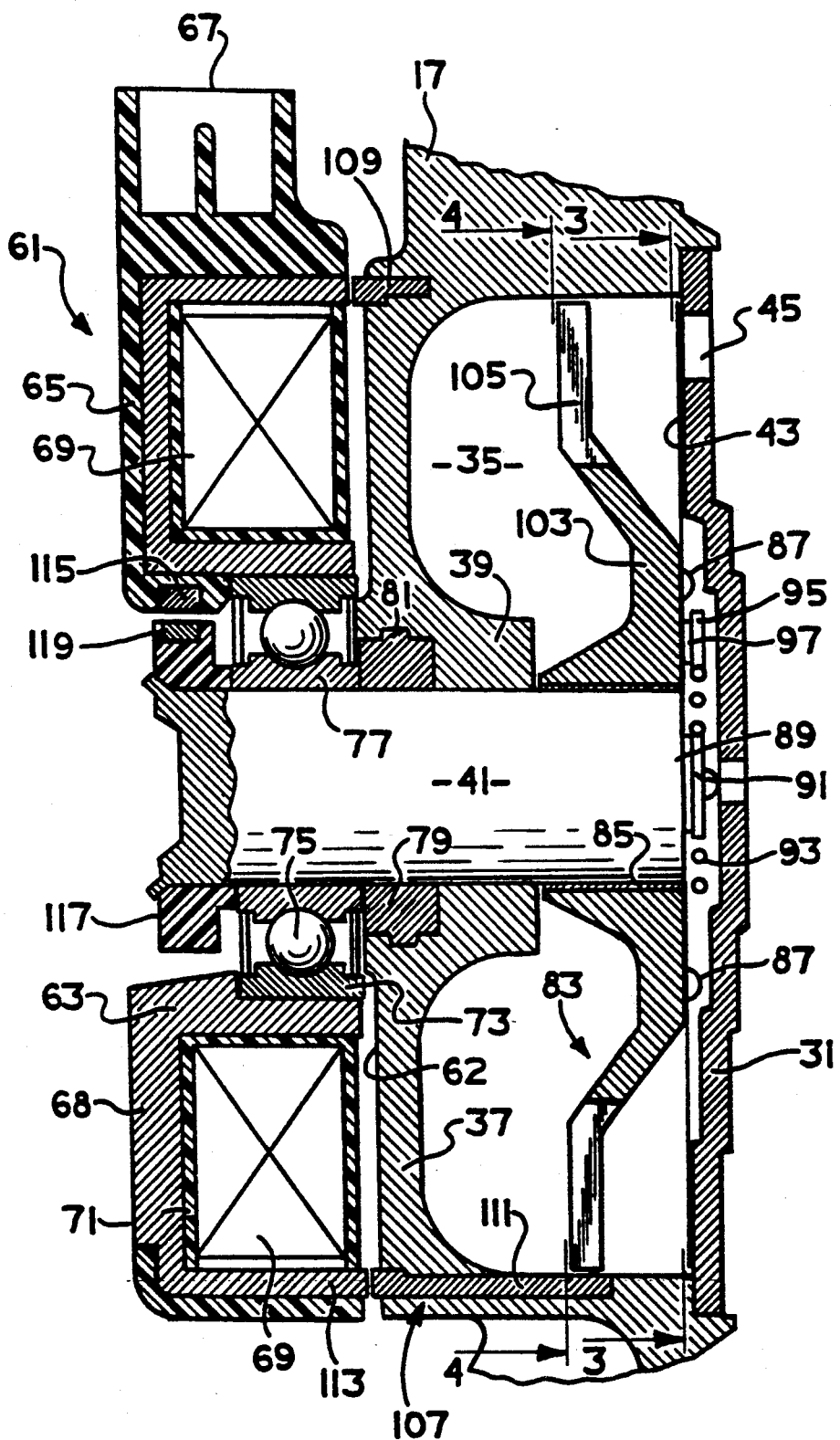
FIG. 2 is an enlarged, fragmentary, axial cross-section of part of the fluid coupling and the actuator assembly of the present invention.

Referring now primarily to FIG. 2, the actuator assembly will be described in some detail. The tethered portion of the actuator assembly 61 comprises a generally annular ferromagnetic housing member 63, which is preferably insert molded into a plastic housing 65. The plastic housing 65 includes an integrally molded electrical connector portion 67, which is adapted to be plugged into a suitable mating electrical connector (not shown) which, as is well known to those skilled in the art, may be part of a tether assembly, attached relative to a stationary object, such as the vehicle chassis or fan shroud, neither of which are shown herein. Disposed within the tether assembly would be the appropriate electrical conductors to communicate electrical signals to and from the tethered portion of the actuator assembly 61. Typically, the plastic housing 65 would not extend continuously over the front surface of the housing member 63. Instead, there would be openings in the plastic housing 65 whereby a plurality of cooling fins 68 (only one of which is shown in FIG. 2), formed integrally with the housing member 63, would extend axially through the plastic housing 65.

Referring still to FIG. 2, it may be seen that the housing member 63 is generally C-shaped in axial section, to accommodate therein an electromagnetic coil 69 which, as is well known to those skilled in the art, is typically wound on a plastic bobbin 71. The housing member 63 is in engagement with an outer race 73 of a set of ball bearings 75. The bearing set 75 includes an inner race 77 which is disposed about the shaft 41.

Disposed to the right of the inner race 77 is a steel insert 79 which, preferably, is insert cast into the cover member 17. The insert 79 defines a protrusion 81, around which aluminum flows during the casting of the cover member 17, thus preventing axial movement of the insert 79 relative to the cover member 17. The function of the steel insert 79 is to provide a hardened surface (i.e., relative to the aluminum cover) into which the shaft 41 is press-fit.

Disposed about the right end of the shaft 41 (in FIG. 2) is a ferromagnetic armature assembly, generally designated 83. Disposed between the ferromagnetic shaft 41 and the ferromagnetic armature 83 there is preferably a non-ferrous bearing surface or bearing sleeve 85, comprising a low-friction material such as a bronze or ceramic material. The valve arm 43, which will be described in greater detail subsequently, is attached to a transverse surface of the armature assembly 83 by means of a pair of rivets 87, such that the valve arm 43 is fixed to the armature assembly 83, and rotates therewith, in a manner to be described subsequently.

Figure 3:
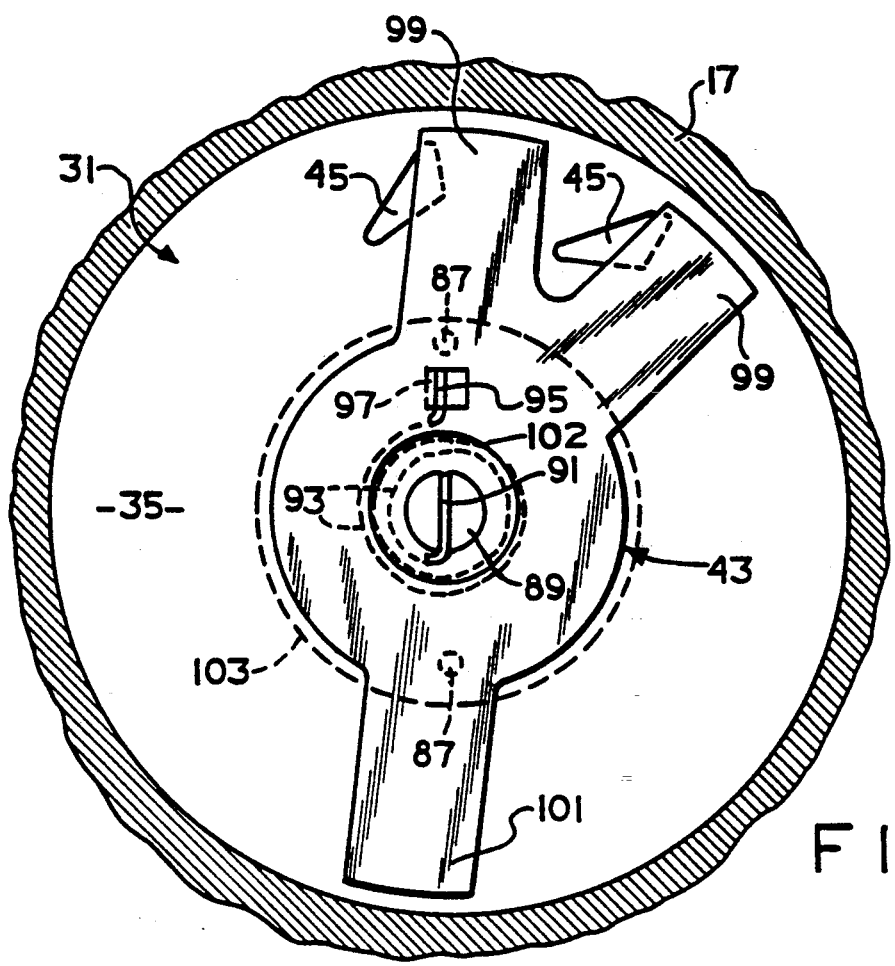
FIG. 3 is a transverse cross-section, taken on line 3—3 of FIG. 2, but on a smaller scale than FIG. 2.

Referring now to FIG. 3, in conjunction with FIG. 2, the rearward end (right end in FIG. 2) of the shaft 41 includes a reduced diameter portion 89, which forms an arbor for an inner end 91 of a spiral, wire torsion spring 93. The inner end 91 of the spring 93 is mechanically grounded to the portion 89 in any suitable manner. The spring 93 includes a radially-extending outer end 95, seated against a seat member 97, which Preferably comprises a tab stamped out of the valve arm 43, and extending axially therefrom. The seat member 97 could also be formed by a protrusion from the armature 83, extending through a stamped opening in the valve arm 43.

As is illustrated and described in greater detail in above-incorporated U.S. Pat. No. 4,974,712, the valve plate 31 defines a pair of substantially identical fill openings 45. The valve arm is generally Y-shaped, and includes a pair of port covering portions 99 and a counterbalancing arm portion 101. The Y-shaped valve arm 43 is a somewhat modified form of the valve arm shown in the '712 patent. For example, the valve arm 43 defines a large circular opening 102, the diameter of which is preferably at least as large as the diameter of the shaft 41, so that there is no electromagnetic "coupling" between the shaft 41 and the valve arm 43, whenever the coil 69 is energized.

As may best be seen in FIG. 3, the spiral spring 93 biases the valve member 43 toward a position in which the covering portions 99 cover the fill openings 45, corresponding to a disengaged condition of the fluid coupling, as is well known to those skilled in the art. Therefore, this embodiment may be referred to as "non-fail-safe", because, in case of the loss of electrical power, the valve arm 43 is biased toward a position which prevents fluid filling of the operating chamber 33. However, it should be understood that the present invention is not so limited and, within the scope of the present invention, the valve arm could be biased toward a position uncovering the fill openings 45, corresponding to an engaged condition of the fluid coupling. Such a device is referred to as being "fail-safe" because, in case of the loss of electrical power, there can still be fluid filling of the operating chamber 33, and cooling of the engine.

Figure 4:
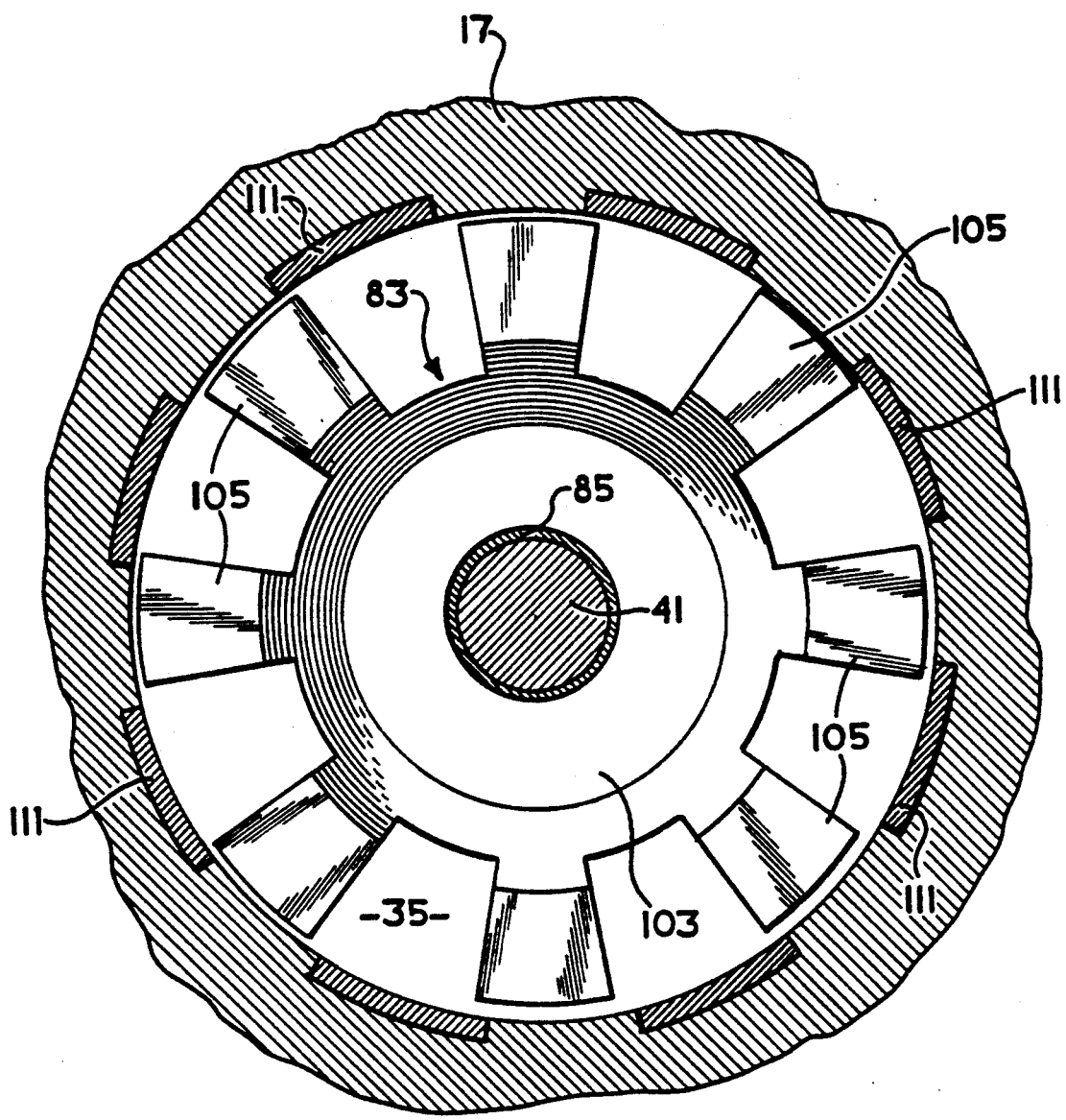
FIG. 4 is a transverse cross-section taken on line 4—4 of FIG. 2, but on a slightly smaller scale than FIG. 2, illustrating the armature and pole pieces of the fluid coupling device of the present invention, in an unactuated position.

Referring now primarily to FIG. 4, in conjunction with FIG. 2, a further aspect of the invention will now be described. The ferromagnetic armature 83 is preferably formed of a single, unitary member and, as is generally well known to those skilled in the art, may comprise a powdered metal part. The armature 83 includes a central hub portion 103, and extending radially therefrom, a plurality of armature segments 105. In the subject embodiment, there are eight of the armature segments 105, although it should be understood that the invention is not limited to any particular number of segments, or any particular configuration thereof. Preferably, each of the segments 105 defines an arc of a circle theoretically having an angular extent equal to approximately 360°, divided by 16 (i.e., twice the number of segments), and therefore, equal to approximately 22°. The reasons for this will become apparent subsequently.

Referring again to FIG. 2, the cover member 17 includes a flux ring 107, which comprises a ferromagnetic member, and may, by way of example only, comprise a powdered metal member which is insert cast into the aluminum cover member 17, in the same general manner as the steel insert 79 is cast into the cover member 17. The flux ring 107 includes a forward, annular portion 109, which preferably projects slightly forward, axially, from the forward surface 62 of the cover member 17. The flux ring 107 includes a plurality of pole pieces 111, each of which is preferably formed integrally with the annular portion 109. As may best be seen in FIG. 4, there are eight of the pole pieces 111, corresponding to the eight armature segments 105. It should be noted that each of the pole pieces 111 is disposed in at least a partially overlapping relationship with the adjacent armature segment 105, and closely spaced apart from the segment 105, in the radial direction. However, it is not essential that there be an initial overlap of each segment 105 and its respective pole piece 111, but those skilled in the art will appreciate that the gap therebetween should be minimized to minimize the electromagnetic reluctance of the resulting flux path (to be described subsequently). It is essential only that each segment 105 and its pole piece be in "operative association" with each other, able to achieve the desired result. It should be noted that the inner surface of the pole pieces 111 defines the outer boundary of the reservoir chamber 35, or stated another way, there should not be any portion of the cast cover member disposed radially between the pole piece 111 and the armature segments 105.

In FIG. 4, the armature assembly 83 is illustrated in an unactuated position, i.e., the electromagnetic coil 69 is not energized, and the valve arm 43 is biased by the spiral spring 93 toward a position covering the fill openings 45. As in the case of the armature segments 105, each of the pole pieces 111 preferably defines the arc of a circle theoretically having an angular extent equal to approximately 360° divided by 16, and therefore, equal to approximately 22°. It should be understood, however, that as a practical matter, the arcuate extent of the gaps between the armature segments 105 may be somewhat greater than the arcuate extent of the segments themselves. Similarly, the arcuate extent of the gaps between the pole pieces 111 may be somewhat greater than the arcuate extent of the pole pieces themselves. In the subject embodiment, upon full energization of the coil 69, the armature can rotate, from the position shown in FIG. 4, about 22 degrees clockwise, until there is full overlap between each segment 105 and its respective pole piece 111. Thus, the desired amount of angular rotation of the valve arm 43 (and the armature 83) is a factor in the selection of the number and spacing of the segments and pole pieces.

With the armature 83 and valve arm 43 biased by the spiral spring 93 to the unactuated position shown in FIG. 4, there is a slight overlap of each pole piece 111, relative to its adjacent armature segment 105. The overlap defines a preferred electromagnetic flux path between the flux ring 107 and the armature 83, which also defines the direction of armature rotation. Therefore, upon energization of the electromagnetic coil 69, the armature 83 will rotate clockwise in FIG. 4. In the position shown in FIG. 4, with a circumferential overlap of only several degrees between each pole piece 111 and its adjacent armature segment 105, the electromagnetic reluctance of the flux path is at its maximum. As is well known to those skilled in the art, reluctance is a measure of the opposition to magnetic lines of flux, and is analogous to the resistance in an electrical conductor to the flow of electrical current. When the coil 69 is energized, the resulting torque on the armature 83 will tend to increase the overlap, thus reducing the reluctance of the flux path.

Referring again primarily to FIG. 2, the annular housing member 63 includes an annular portion 113 (best seen in the lower half of FIG. 2) which surrounds the electromagnetic coil 69 about most of the circumference thereof. The annular portion 113 of the stationary actuator 63 is disposed in a face-to-face relationship, across a narrow air gap, with the annular portion 109 of the flux ring 107. Furthermore, the annular portions 113 and 109 have substantially the same radial dimension, to optimize the flux path between the stationary annular portion 113 and the rotating annular portion 109.

OPERATION

Figure 5:
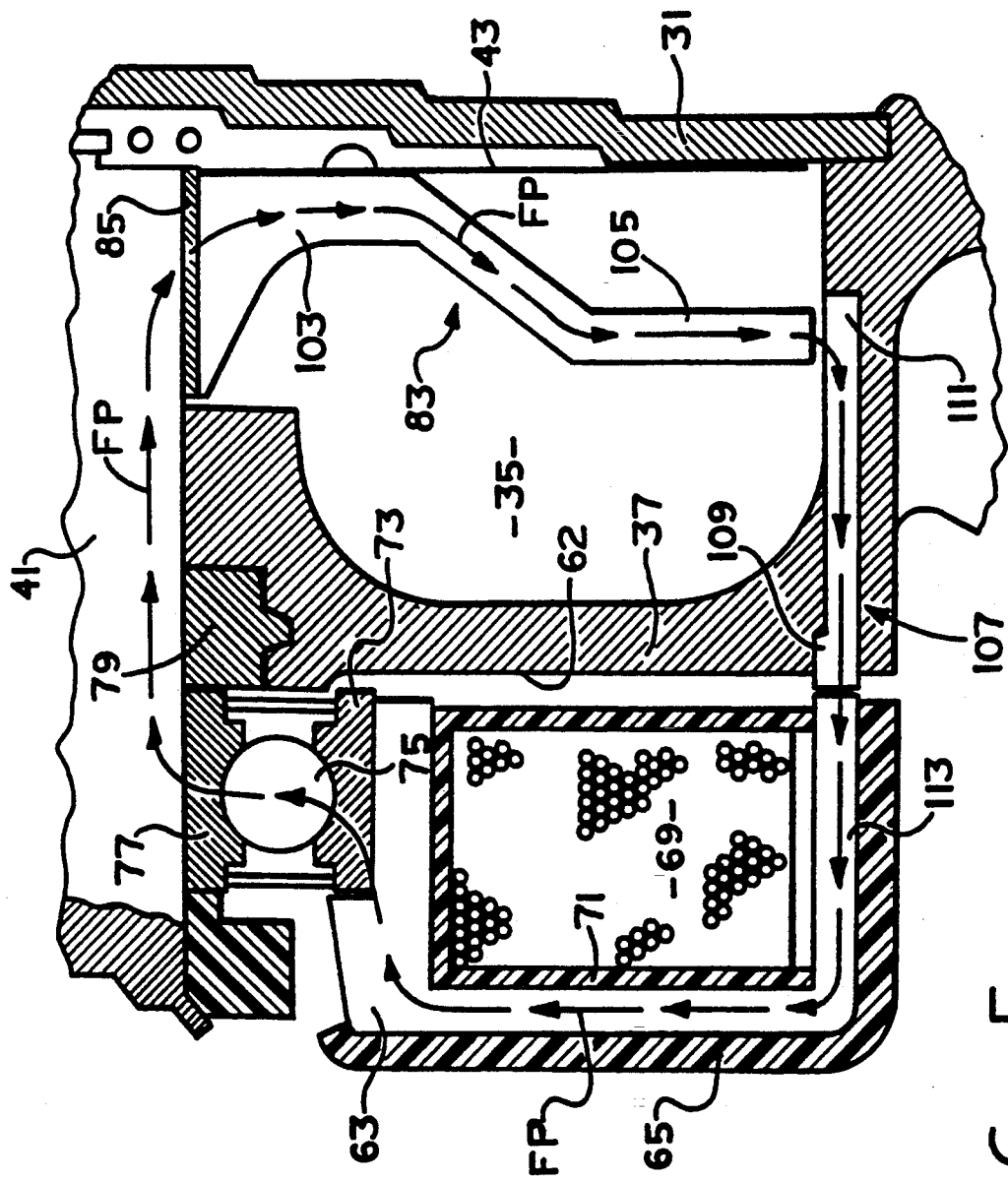
FIG. 5 is a greatly enlarged, fragmentary, axial cross-section similar to FIG. 2, but on a different plane than FIG. 2, illustrating the flux path which occurs during actuation of the actuator assembly.

Referring now also to FIG. 5, in conjunction with FIGS. 2 and 4, when a condition is sensed (e.g., increased coolant temperature) which indicates a need for increased fan speed, an electrical signal is transmitted to the coil 69. Upon energization of the coil 69, there is a magnetic flux path FP created (see FIG. 5) which is capable of rotating the armature 83 and the valve arm 43 toward a position in which the fill openings 45 are uncovered (see FIG. 3).

The flux path FP created when the coil 69 is energized passes through the annular portion 113 of the ferromagnetic housing member 63, then radially inward from there, then radially inward through the outer race 73, the ball bearings 75, and the inner race 77. The flux path FP then passes through, and axially along, the ferromagnetic valve shaft 41, across the non-ferrous bearing sleeve 85, then radially outward through the hub portion 103 of the armature 83. The sleeve 85 is non-ferrous because the armature 83 must be able to rotate relative to the shaft 41. If the sleeve 85 were ferrous, there would be a tendency for the armature to "lock" to the shaft. As will be understood by those skilled in the art, the flux lines passing through the hub portion 103 will then be concentrated within the armature segments 105, then will pass across the narrow radial air gap between each of the segments 105 and the adjacent pole piece 111. The flux path FP passes forwardly through the pole pieces 111, then the flux density decreases in the annular portion 109, which is aligned with the annular portion 113, but separated therefrom by a narrow axial air gap.

As the lines of flux pass from the armature segments 105 into the pole pieces 111, which initially are only slightly overlapping, the result is the generation of a torque on the armature 83, in a direction to minimize the reluctance of the magnetic flux path FP, rotating the armature 83 clockwise from the position shown in FIG. 4 toward a position in which the valve arm will be in the open position shown in FIG. 3. As will be understood by those skilled in the art, it is important to minimize the air gaps to minimize the overall electromagnetic reluctance of the system, and therefore the use of radial air gaps between the armature segments 105 and the pole pieces 111 is an advantage of the invention, because radial gaps can be minimized, and kept consistent, more easily than axial air gaps. The Provision of radial air gaps adjacent the armature 83 also minimizes axial forces acting on the armature, thus minimizing stray or parasitic torques on the armature. It is also important to minimize the axial air gap between the annular portion 109 and the annular portion 113.

As the current to the coil 69 is increased, a greater torque is applied to the armature 83, rotating it against the biasing force of the torsion spring 93, and increasing the overlap between each armature segment 105 and its respective pole piece 111. The increasing overlap reduces the magnetic reluctance in the electromagnetic circuit. The device described above is generally referred to as a magnetic variable reluctance torque actuator, by those skilled in the art. Electromagnetic torque will be produced, and act on the armature, as the armature rotates, up to the point at which the overlap between the armature segments 105 and the pole pieces 111 is at a maximum.

Referring again primarily to FIG. 2, there is a Hall device 115 located at a radially inward portion of the ferromagnetic housing member 63. Disposed about the forward end of the valve shaft 41, and preferably, firmly retained against the inner race 77, is an annular plastic ring 117 having molded therein a series of circumferentially spaced apart magnetic pole pieces 119. The Hall device 115, as is well known in the art, senses the passing pole pieces 119, and transmits, by means of a series of electrical leads (not shown herein) a speed signal (i.e., speed of the output coupling assembly 13). The speed signal is transmitted to the controller or logic which generates the input signal to the coil 69, and, typically, would be used to control the level of current transmitted to the coil and therefore, the degree of opening of the valve arm 43, thus providing a "closed loop" control system of the type generally well known in the art. An example of such a control is illustrated and described in U.S. Pat. No. 4,828,088, for a "CLOSED LOOP PULSE MODULATED VISCOUS FAN CONTROL", assigned to the assignee of the present invention, and incorporated herein by reference.

ALTERNATIVE EMBODIMENT

Figure 6:
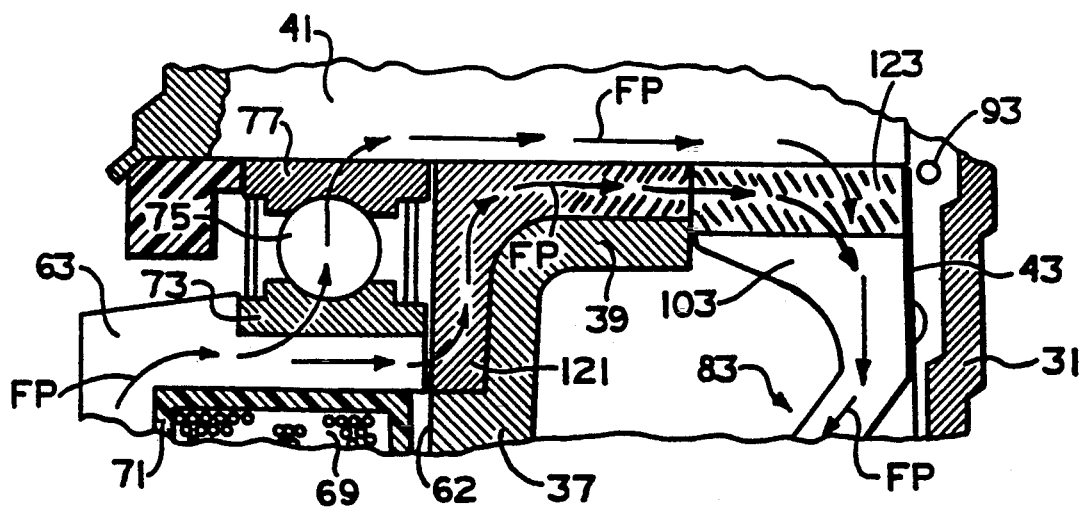
FIG. 6 is an enlarged, fragmentary, axial cross-section, similar to FIG. 5, illustrating an alternative embodiment of the present invention.

Referring now primarily to FIG. 6, there is illustrated an alternative embodiment of the present invention. In the embodiment of FIG. 6, like elements will bear like reference numerals, and added or substantially modified elements will bear reference numerals in excess of 120. In the alternative embodiment, the steel insert 79 is replaced by a larger steel insert 121 which extends radially outwardly in FIG. 6, far enough that it is separated by only a narrow axial air gap from an adjacent portion of the housing member 63.

The other structural difference in the alternative embodiment is the inclusion of a ferrous arbor ring 123, disposed radially between the shaft 41 and the armature 83. Preferably, there would be a non-ferrous coating applied to either the outside diameter of the arbor ring 123 or to the inside diameter of the armature 83.

The purpose of the alternative embodiment is to reduce the overall reluctance of the electromagnetic circuit. The total area of contact between the ball bearings 75 and the inner and outer races 77 and 73 is typically fairly small. Therefore, as may be seen by the arrows in FIG. 6, the alternative embodiment provides a parallel flux path from the radially inner Portion of the housing member 63, across the narrow axial gap, then through the steel insert 121, then axially through the arbor ring 123, and outwardly through the armature 83, in the manner illustrated and described previously. The result of the additional, parallel flux path is to reduce the effective reluctance of the electromagnetic circuit, thus making it possible to exert a greater torque on the armature 83 (or alternatively, reduce the size of the coil 69 or the current flow through the coil).

It may be seen that the present invention provides an actuator assembly which is relatively simple in construction, and therefore, could be manufactured relatively inexpensively. In addition, the present invention provides an actuator assembly which utilizes electromagnetic actuation of the valve member 43, but does so without relying upon frictional engagement of friction surfaces. In the entire actuator assembly 61 shown in FIG. 2, the only relative motion at "full speed" (i.e., where the speed difference is equal to the absolute speed of the output coupling assembly) is at the ball bearings 75. At the bearing sleeve 85, there is only a slight speed difference, and it occurs only occasionally (while the actuated torqued level of the armature 83 is being changed). Therefore, the actuator assembly of the present invention should continue to operate over a long period of time in a repeatable, predictable fashion, relatively unaffected by factors such as variations in fluid temperature and fluid viscosity.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid coupling device of the type including a first rotatable coupling assembly defining an axis of rotation, said first coupling assembly including a first coupling member and a cover member cooperating to define a fluid chamber therebetween; valve means associated with said first coupling assembly and disposed to separate said fluid chamber into a fluid operating chamber and a fluid reservoir chamber; a second rotatable coupling member disposed in said fluid operating chamber and being rotatable relative to said first coupling member, said first coupling assembly cooperating with said second coupling member to define a viscous shear space therebetween, said valve means being operable to control the flow of fluid between said reservoir chamber and said operating chamber; means operable to pump fluid from said operating chamber into said reservoir chamber in response to a difference in speed of rotation of said first and second coupling members; said valve means including a plate-like member disposed generally perpendicular to said axis of rotation and defining a fluid inlet port, and a valve member comprising a generally flat member disposed to move in a plane parallel to said plate-like member, and closely spaced thereto, said valve member being movable between an open position permitting fluid flow through said inlet port, and a closed position substantially blocking fluid flow through said inlet port; means biasing said valve member toward one of said open and closed positions; and an actuator assembly operably associated with said first coupling assembly and with said valve member and operable to move said valve member toward the other of said open and closed positions, in position to the force of said biasing means, said actuator assembly including a source of an electromagnetic field; characterized by:
 (a) an armature member, including a plurality of armature segments, disposed in said reservoir chamber and operably associated with said valve member to rotate therewith;
 (b) said actuator assembly including a ferromagnetic housing portion disposed adjacent said source of said electromagnetic field;
 (c) said actuator assembly disposed adjacent a forward surface of said cover member;
 (d) a plurality of electromagnetic pole pieces, each disposed within said cover member and having a forward end portion extending axially forward to a location adjacent said forward surface of said cover member, said pole pieces being disposed in an annular pattern about said axis of rotation, whereby said forward end portions are disposed axially adjacent said ferromagnetic housing portion and closely spaced axially thereto as said first coupling assembly rotates relative to said actuator assembly; and
 (e) each of said plurality of pole pieces being disposed adjacent one of said armature segments and in operative association therewith, whereby, upon energization of said source of said electromagnetic field, a flux path is established which includes said ferromagnetic housing portion, said armature segments, and said electromagnetic pole pieces.

2. A fluid coupling device as claimed in claim 1, characterized by each of said plurality of pole pieces being disposed in a partially overlapping relationship with the adjacent one of said armature segments in the absence of energization of said source of said electromagnetic field.

3. A fluid coupling device as claimed in claim 2, characterized by said armature member including a plurality N of armature segments, and said device including a plurality N of electromagnetic pole pieces.

4. A fluid coupling device as claimed in claim 3, characterized by each of said plurality N of said electromagnetic pole pieces defines an arc of a circle having an angular extent equal to approximately 360/2N degrees.

5. A fluid coupling device as claimed in claim 4, characterized by each of said plurality N of armature segments defines an arc of a circle having an angular extent equal to approximately 360/2N degrees.

6. A fluid coupling device as claimed in claim 2, characterized by said forward end portion of said electromagnetic pole pieces comprising a circumferentially continuous, annular portion, and each of said electromagnetic pole pieces being formed integrally with said annular portion.

7. A fluid coupling device as claimed in claim 2, characterized by said cover member comprising a cast, non-ferromagnetic member, and each of said Plurality of electromagnetic pole pieces being insert cast within said cast cover member.

8. A fluid coupling device as claimed in claim 2, characterized by said source of said electromagnetic field comprising an electromagnetic coil, and said ferromagnetic housing portion includes an annular housing portion disposed radially outward from said electromagnetic coil and closely spaced thereto.

9. A fluid coupling device as claimed in claim 2, characterized by said biasing means being operable to bias said valve member and said armature member toward a position of minimum overlap of said electromagnetic pole pieces and said armature segments.

10. A fluid coupling device as claimed in claim 2, characterized by said device including a ferromagnetic valve shaft, said armature member being rotatably disposed about said valve shaft, said flux path including said valve shaft.

11. A fluid coupling device as claimed in claim 10, characterized by said ferromagnetic housing portion being stationary, said ferromagnetic valve shaft being rotatable with said cover member, and bearing means being disposed radially between said valve shaft and said housing portion; said flux path including said bearing means.

12. A fluid coupling device of the type including a first rotatable coupling assembly defining an axis of rotation, said first coupling assembly including a first coupling member and a cover member cooperating to define a fluid chamber therebetween; valve means associated with said first coupling assembly and disposed to separate said fluid chamber into a fluid operating chamber and a fluid reservoir chamber; a second rotatable coupling member disposed in said fluid operating chamber and being rotatable relative to said first coupling member, said first coupling assembly cooperating with said second coupling member to define a viscous shear space therebetween, said valve means being operable to control the flow of fluid between said reservoir chamber and said operating chamber; in response to a rotary input motion and an actuator assembly operably associated with said first coupling assembly and with said valve means and operable to move said valve means, said actuator assembly including a source of an electromagnetic field; characterized by:

(a) an armature member, including a plurality of armature segments, disposed in said reservoir chamber and operable to provide said rotary input motion;

(b) said actuator assembly including a ferromagnetic housing portion disposed adjacent said source of said electromagnetic field;

(c) said actuator assembly disposed adjacent a forward surface of said cover member;

(d) a plurality of electromagnetic pole pieces, each disposed within said cover member extending axially forward to a location adjacent said forward surface of said cover member, said pole pieces being disposed in an annuar pattern about said axis of rotation, whereby said pole pieces are disposed adjacent said ferromagnetic housing portion and closely spaced thereto as said first coupling assembly rotates relative to said actuator assembly; and (e) each of said plurality of pole pieces being disposed adjacent one of said armature segments and in operative association therewith, whereby, in at least a partially overlapping relationship, whereby, upon energization of said source of said electromagnetic field, a flux path is established which includes said ferromagnetic housing portion, said electromagnetic pole pieces, and said armature segments.

13. A fluid coupling device as claimed in claim 12, characterized by each of said plurality of pole pieces being disposed in a partially overlapping relationship with the adjacent one of said armature segments in the absence of energization of said source of said electromagnetic field.

14. A fluid coupling device as claimed in claim 13, characterized by said armature member including a plurality N of armature segments, and said device including a plurality N of electromagnetic pole pieces.

15. A fluid coupling device as claimed in claim 14, characterized by each cf said plurality N of said electromagnetic pole pieces defines an arc of a circle having an angular extent equal to approximately 360/2N degrees.

16. A fluid coupling device as claimed in claim 14, characterized by each of said plurality N of armature segments defines an arc of a circle having an angular extent equal to approximately 360/2N degrees.

17. A fluid coupling device as claimed in claim 13, characterized by said electromagnetic pole pieces including a circumferentially continuous, annular portion, and each of said electromagnetic pole pieces being formed integrally with said annular portion.

18. A fluid coupling device as claimed in claim 13, characterized by said cover member comprising a cast, non-ferromagnetic member, and each of said plurality of electromagnetic pole pieces being insert cast within said cast cover member.

19. A fluid coupling device as claimed in claim 13, characterized by said source of said electromagnetic field comprising an electromagnetic coil, and said ferromagnetic housing portion includes an annular housing portion disposed radially outward from said electromagnetic coil and closely spaced thereto.

20. A fluid coupling device as claimed in claim 13, characterized by means operable to bias said valve means and said armature member toward a position of minimum overlap of said electromagnetic pole pieces and said armature segments.

21. A fluid coupling device as claimed in claim 13, characterized by said device including a ferromagnetic valve shaft, said armature member being rotatably disposed about said valve shaft, said flux path including said valve shaft.

22. A fluid coupling device as claimed in claim 21, characterized by said ferromagnetic housing portion being stationary, said ferromagnetic valve shaft being rotatable with said cover member, and bearing means being disposed radially between said valve shaft and said housing portion; said flux path including said bearing means.

* * * * *